Jan. 19, 1965 R. C. COLE 3,166,598
MERCAPTANS PRODUCTION
Filed Dec. 14, 1962
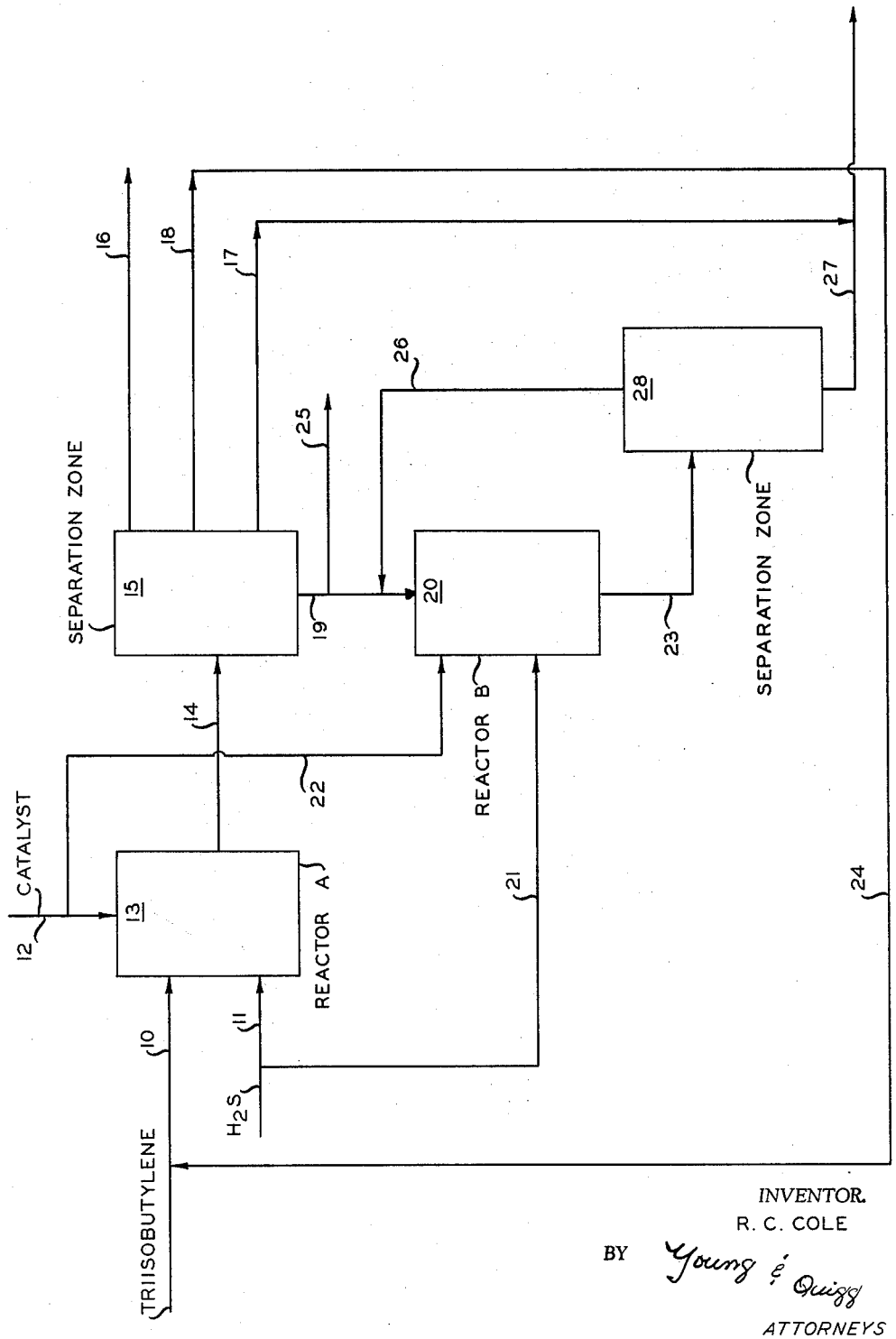
INVENTOR.
R. C. COLE
BY *Young & Quigg*
ATTORNEYS

United States Patent Office 3,166,598
Patented Jan. 19, 1965

3,166,598
MERCAPTANS PRODUCTION
Ralph C. Cole, Bartlesville, Okla., assignor to Phillips
Petroleum Company, a corporation of Delaware
Filed Dec. 14, 1962, Ser. No. 244,708
2 Claims. (Cl. 260—609)

This invention relates to a process for the production of tertiary butyl mercaptans. More particularly, this invention relates to a method for producing tertiary butyl mercaptans from tertiary octyl mercaptans. In one aspect this invention relates to a process for improving the economics of a tertiary dodecyl mercaptan system by converting by-product tertiary octyl mercaptan to a lower molecular weight compound.

In the production of tertiary dodecyl mercaptan from triisobutylene and hydrogen sulfide, a tertiary octyl mercaptan by-product is obtained. While this by-product is useful, lower molecular weight mercaptans are desirable for many purposes. Thus a method for converting the higher molecular weight tertiary mercaptans such as tertiary octyl mercaptans to a lower molecular weight tertiary mercaptan such as tertiary butyl mercaptan would be of significant value. For example, a method of providing other saleable products from by-product material would add significantly to the economics of the overall process from which the by-product initially was obtained.

Therefore it is an object of this invention to provide a method for the production of lower molecular weight mercaptans from higher molecular weight mercaptans.

Another object of this invention is to provide a process for the conversion of tertiary octyl mercaptans to tertiary butyl mercaptans.

Other objects, aspects and the several advantages of this invention will be apparent to those skilled in the art from the following discussion, the claims, and the drawing, which is a schematic view of the process of the invention.

In accordance with this invention, I have discovered that higher molecular weight tertiary mercaptans can be readily converted to lower molecular weight tertiary mercaptans by treating same with hydrogen sulfide in the presence of a suitable catalyst. More particularly, by subjecting tertiary octyl mercaptans to the action of hydrogen sulfide in the presence of a Filtrol catalyst there is obtained substantial conversion to the tertiary butyl mercaptan.

The process of this invention can further be illustrated by reference to the accompanying drawing which represents in schematic form an arrangement of apparatus suitable for carrying out the invention.

In one embodiment, triisobutylene is introduced by way of conduit 10 to reactor A, 13. Filtrol catalyst is introduced by way of conduit 12 and hydrogen sulfide is provided by way of conduit 11 communicating with the reactor 13. Reactor 13 is maintained at about 900 p.s.i.g. at 75° to 86° F. and the resulting reaction mass is passed by means of conduit 14 to separation zone 15 from which tertiary dodecyl mercaptan is removed by way of conduit 16. Any tertiary butyl mercaptan produced during the reaction is removed by means of conduit 17 which communicates with conduit 27. Unreacted triisobutylene can be removed by way of conduit 18 and returned through conduit 24 to reactor 13 as recycle. The tertiary octyl mercaptan by-product of the reaction is passed by way of conduit 19 to reactor B, 20, wherein additional catalyst is provided by means of conduit 22 and additional hydrogen sulfide is supplied by means of conduit 21. The reactor 20 is maintained at a pressure of about 800 p.s.i.g. at 300° to 400° F. to convert the tertiary octyl mercaptan to tertiary butyl mercaptan. The resulting mercaptan is removed from reactor 20 by means of conduit 23. Conduit 17 communicating with conduit 27 provides a means for the total tertiary butyl mercaptan to be combined and additionally heated. Tertiary octyl mercaptan when desired can be removed by means of conduit 25, thus allowing only that amount excessive to the current needs to be converted to tertiary butyl mercaptan in accordance with this invention. The reactor effluent is passed to separation zone wherein the desired tertiary butyl mercaptan is separated and removed by way of conduit 27. Unreacted tertiary octyl mercaptan is recycled by way of conduit 26 to reactor 20 for additional treatment.

The following example will further illustrate the invention.

Example

A 200 ml. jacketed catalyst case equipped with a thermowell and heater was supplied with Filtrol Grade 71 catalyst activated at 400° F. in a stream of air prior to use. Tertiary octyl mercaptan to be used had a boiling range of between 280° and 330° F. and was removed from the system for manufacture of tertiary dodecyl mercaptan. The tertiary octyl mercaptan had the following composition by chromatograph.

| Component: | Weight percent |
|---|---|
| Tertiary butyl mercaptan | Trace |
| Diisobutylenes | 0.5 |
| Di-tertiary butyl sulfide | 4.5 |
| Triisobutylene | 5.5 |
| Tertiary octyl mercaptan | 89.5 |

Hydrogen sulfide and the tertiary octyl mercaptan produced as by-product in the production of tertiary dodecyl mercaptan were added in a 2:1 mol ratio to a reactor at a constant rate. A pressure controller on the case outlet of the reactor maintained the pressure on the system. Temperatures between 300 and 400° F. were employed, a reactor temperature of about 350° F. being preferred. A pressure within the range of about 700 to 850 p.s.i.g. was maintained, about 800 p.s.i.g. being preferred. The resulting tertiary butyl mercaptan cut when distilled from the composite effluent from the reactor gave a product with a mercaptan purity, weight percent, of 95.3 (mercaptan purity determined by mercaptan sulfur analysis). The tertiary butyl mercaptan content of the effluent was 40.2 weight percent. The tertiary octyl mercaptan content from the reactor was recycled at 350° F. and 800 p.s.i.g. over the same catalyst and upon subsequent separation of the effluent from the recycle operation gave about 22.2 weight percent tertiary butyl mercaptan.

As indicated by the above example, tertiary butyl mercaptan can be produced in good yield from tertiary octyl mercaptan. Filtrol catalyst is active for the reaction, giving conversions as high as 40 percent per pass for fresh feed and 24 percent for recycle feed.

The term "Filtrol catalyst" as employed herein is inclusive of the group of acid-activated adsorption contact catalyst made from relatively pure crystals of montmorillonite $(Mg, Ca)O \cdot Al_2O_3 \cdot 5SiO_2 \cdot nH_2O$. Such catalyst may be used either with liquids or with gases in either pellet or powder form.

Reasonable variations and modifications are possible within the scope of the foregoing disclosure without departing from the spirit or scope thereof.

I claim:
1. A process for forming tertiary butyl mercaptans from tertiary octyl mercaptans which comprises reacting said tertiary octyl mercaptans with hydrogen sulfide at a temperature within the range of about 300° to 400° F. and a pressure within the range of about 700 to 850 p.s.i.g. in the presence of an acid activated montmorillonite absorption contact catalyst.
2. The process of claim 1 wherein the temperature is about 350° F. and the pressure is about 800 p.s.i.g.

No references cited.